US012007336B2

(12) United States Patent
Chan

(10) Patent No.: US 12,007,336 B2
(45) Date of Patent: Jun. 11, 2024

(54) SENSING ARRANGEMENT FOR MONITORING CONTAMINATION OF COVER SLIDE ON LASER PROCESSING HEAD

(71) Applicant: II-VI Delaware, Inc., Wilmington, DE (US)

(72) Inventor: Danny Chan, Kleinmachnow (DE)

(73) Assignee: II-VI DELAWARE, INC., Wilmington, DE (US)

( * ) Notice: Subject to any disclaimer, the term of this patent is extended or adjusted under 35 U.S.C. 154(b) by 747 days.

(21) Appl. No.: 17/116,100

(22) Filed: Dec. 9, 2020

(65) Prior Publication Data

US 2022/0176497 A1 Jun. 9, 2022

(51) Int. Cl.
*G01N 21/958* (2006.01)
*G01N 21/15* (2006.01)
*G01N 21/94* (2006.01)
*G05B 19/406* (2006.01)

(52) U.S. Cl.
CPC ........... *G01N 21/958* (2013.01); *G01N 21/94* (2013.01); *G05B 19/406* (2013.01); *G01N 2021/157* (2013.01); *G01N 2201/06113* (2013.01); *G01N 2201/0636* (2013.01); *G05B 2219/37275* (2013.01); *G05B 2219/50203* (2013.01)

(58) Field of Classification Search
CPC .............................. G01N 21/94; G01N 21/958
See application file for complete search history.

(56) References Cited

U.S. PATENT DOCUMENTS

| 5,812,270 A * | 9/1998 | Hampton | G01J 1/04 356/394 |
|---|---|---|---|
| 9,261,702 B2 | 2/2016 | Chan | |
| 11,077,520 B1 * | 8/2021 | Rudolf | B23K 26/127 |
| 2014/0285900 A1 | 9/2014 | Grapov et al. | |
| 2019/0176263 A1 | 6/2019 | Ziemann | |

OTHER PUBLICATIONS

II-VI Highyag, "Force for Precision Laser Processing Head RSK," Brochure, dated Jan. 2020, 6 pages.
HK Laser & Systems, "HK Maintenance Manual," undated, obtained from www.hk-global.com on Dec. 2020, 82 pages.
II-VI Highyag, "Laser-Processing-Heads BIMO," downloaded from http://www.highyag.com/, copyright 2016, 3 pages.
II-VI, "Laser Processing Heads PDT," Brochure, copyright 2019, 5 pages.
II-VI, "Next Generation BIMO-FSC," Brochure, copyright 2020, 2 pages.

* cited by examiner

Primary Examiner — Hina F Ayub
(74) Attorney, Agent, or Firm — Blank Rome LLP

(57) ABSTRACT

A sensing apparatus monitors a cover optic on a laser processing head for contamination, indicating the need to replace the cover optic. The apparatus includes at least one reflector and at least one sensors that are disposed in the processing head adjacent a periphery of the cover optic. The reflector reflects radiation from the laser beam deflected from contamination on the cover optic and incident thereagainst. The sensor is offset from the reflector and detects at least a portion of the radiation reflected by the reflector. A controller in communication with the sensor can determine the contamination on the cover optic based on the detected radiation.

24 Claims, 6 Drawing Sheets

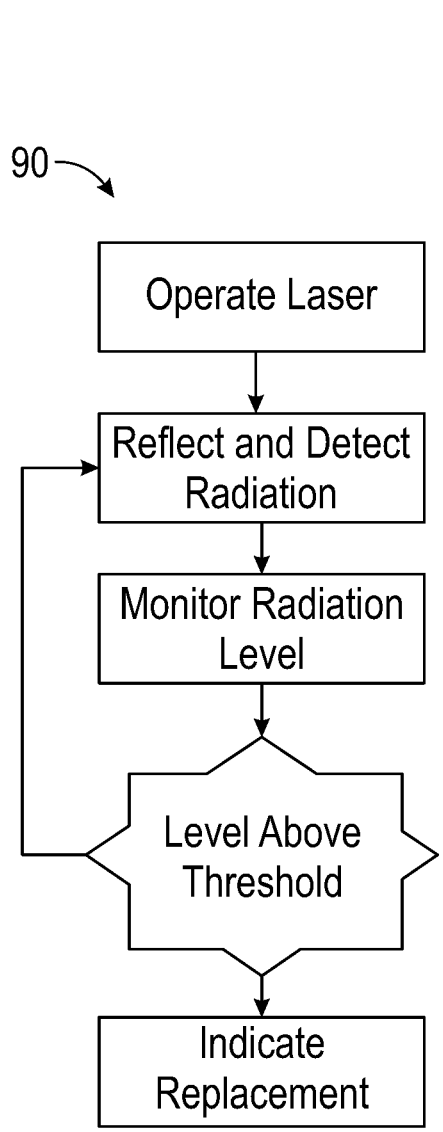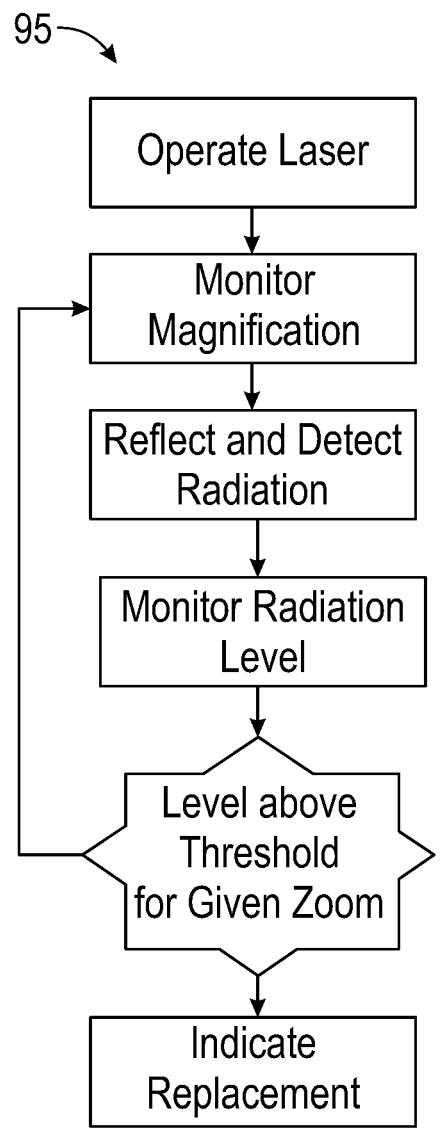
FIG. 4A
FIG. 4B

SENSING ARRANGEMENT FOR MONITORING CONTAMINATION OF COVER SLIDE ON LASER PROCESSING HEAD

FIELD OF THE DISCLOSURE

The subject matter of the present disclosure is directed to monitoring for contamination on an optical element, and in particular to monitoring for contamination on a cover slide of a laser processing head.

BACKGROUND OF THE DISCLOSURE

In materials processing, a cover slide is used in a laser processing head to protect internal lasing optics. For example, a laser cutting head produces a laser beam that melts a target material. An assist gas evacuates molten material to create a kerf in the workpiece. The pressure and volume of the assist gas is carefully controlled, especially when the laser is used to penetrate the material. If the pressure of the assist gas is too high, then excess spatter may stick to the nozzle and the cover slide of the laser processing head. Over time, the cover slide needs to be changed so contamination does not interfere with the laser beam.

Some lasing operations and some materials may produce more contaminants than others. For example, cutting galvanized materials can release microscopic particles from the material's zinc coating, producing a very fine dust. Also, contamination inside the laser processing head can build up on the inside surface of the cover slide and can interfere with operation.

As will be appreciated, contamination on the cover slide can change the optical qualities of the emitted laser beam. Also, scattered light from the cover slide can heat and damage other components of the processing head or can interfere with their operation. Therefore, the contamination is preferably monitored so the cover slide can be changed before the optical quality is reduced.

To monitor the cover slide, the laser processing head may use an optical sensor to detect the contamination on the cover slide. In a standard solution to monitor the cover slide, stray light can be monitored from an edge of the cover slide using a stray light sensor. Unfortunately, the signal that is detected depends a great deal on characteristics of the surface of at the edge of the cover slide, and sometimes also depends on the surface of the mount in which the cover slide is held. Some areas of the cover slide may not contribute to the detected stray light signal at all, meaning the measurement of the cover slide's contamination may be inaccurate.

In another solution, a pyrometer sensor mounted above the cover slide can be used to monitor the cover slide directly from above. Although this arrangement may help to better view the surface area of the cover slide, the orientation of the sensor increases the height and overall space of the arrangement needed to monitor the cover slide. The needed space for the pyrometer can complicate the arrangement of lasing optics, can alter the distance the cover slide can have from the lasing process, and can interfere with other parameters of the laser processing head.

The subject matter of the present disclosure is directed to overcoming, or at least reducing the effects of, one or more of the problems set forth above.

SUMMARY OF THE DISCLOSURE

As disclosed herein, an apparatus is used for a laser processing head having a replaceable cover optic. The replaceable cover optic is disposed in line with a longitudinal axis of a laser beam emitted from the laser processing head in a lasing process. The apparatus comprises at least one reflector and at least one sensor. The at least one reflector is disposed adjacent a periphery of the replaceable cover optic. The at least one reflector is configured to reflect radiation generated by interaction of the laser beam with contamination on the replaceable cover optic and incident against the at least one reflector. The at least one sensor is disposed adjacent the periphery of the replaceable cover optic. The at least one sensor is disposed in offset relation relative to the at least one reflector. The at least one sensor is configured to detect at least a portion of the radiation reflected by the at least one reflector.

As disclosed herein, a laser processing head has a replaceable cover optic. The replaceable cover optic is disposed in line with a laser beam emitted from the laser processing head. The head comprises a receptacle, at least one reflector, and at least one sensor. The receptacle is disposed on the laser processing head for holding the replaceable cover optic.

The at least one reflector is disposed adjacent the receptacle. The at least one reflector is configured to reflect radiation generated by interaction of the laser beam with contamination on the replaceable cover optic and incident against the at least one reflector. The at least one sensor is disposed adjacent the periphery of the receptacle. The at least one sensor is disposed in offset relation relative to the at least one reflector. The at least one sensor is configured to detect at least a portion of the radiation reflected by the at least one reflector.

A method disclosed herein is used with a laser processing head having a replaceable cover optic. The replaceable cover optic is disposed in line with a laser beam emitted from the laser processing head. The method comprises: reflecting, with at least one reflector disposed on the laser processing head adjacent the replaceable cover optic, radiation from generated by interaction of the laser beam with contamination on the replaceable cover optic and incident against the at least one reflector; detecting, with at least one sensor disposed on the laser processing head adjacent the periphery of the replaceable cover optic and in offset relation relative to the at least one reflector, at least a portion of the radiation reflected by the at least one reflector; and determining a level of the contamination on the replaceable cover optic based on the radiation detected by the at least one sensor.

The foregoing summary is not intended to summarize each potential embodiment or every aspect of the present disclosure.

BRIEF DESCRIPTION OF THE DRAWINGS

FIGS. 4A-4B illustrate flow charts of a process for monitoring contamination of a sensing optic.

DETAILED DESCRIPTION OF THE DISCLOSURE

Figure 1:
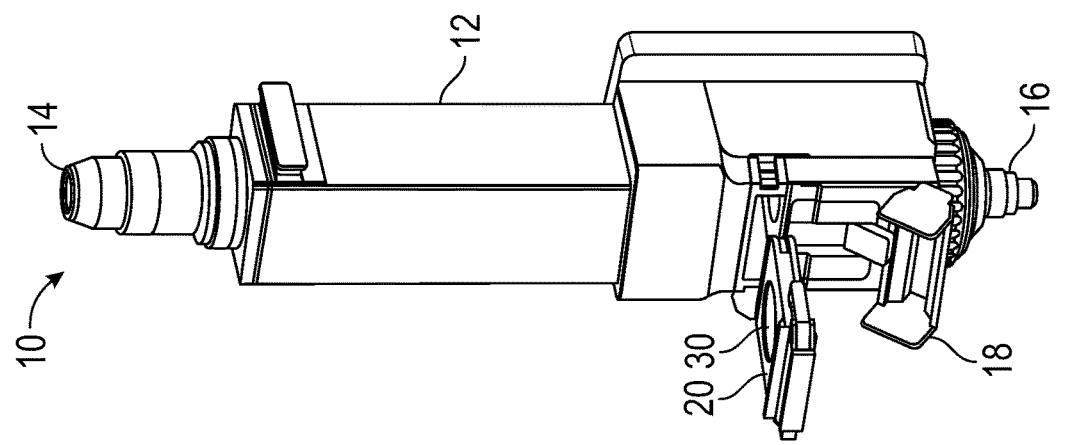
FIG. 1 illustrates a perspective view of an example of a laser processing head according to the present disclosure.

FIG. 1 illustrates a perspective view of an example of a laser processing head 10 according to the present disclosure. The laser processing head 10 includes a housing 12 for internal optics. A connection 14 at one end of the housing 12 can couple to a laser cable, which conducts the laser energy into the head 12. An output or nozzle 16 at the other end of the housing 12 allows the focused laser beam to be emitted from the housing 12 for achieving the purposes of the lasing operation, such as welding, additive manufacture, cutting, etc. This particular arrangement with the nozzle 16 is a cutting head 10. In general, the cutting head 10 may benefit from the features disclosure herein more than a welding or other type of head.

To protect the internal optics inside the housing 12, the head 10 includes a cover slide cartridge 20 that holds a replaceable cover optic, cover slide, or protective window 30. This cover optic 30 acts as a transparent window between the interior of the housing 12 (having the internal optics) and the external environment (exposed to the lasing process). Removal and replacement of the cartridge 20 can be made through an access door 18 in the side of the head 10. As is typical, the cover optic 30 is composed of a transparent material, such as an appropriate glass, that allows the laser beam to pass through it, but prevents passage of contamination into the head's housing 12.

The cover optic 30 is placed under a focusing lens inside the head's housing 12 and is fitted in the cartridge 20 that facilitates replacement. To replace the cover optic 30, the access door 18 can be opened, and the cartridge 20 holding the cover slide 30 can be pulled out of the head 10, which exposes the internal optics in the cutting head 10 to the atmosphere and possible contamination. Another cartridge 20 having a new cover slide 30 can then be installed in the head 10 to continue the lasing operation.

Figure 2:
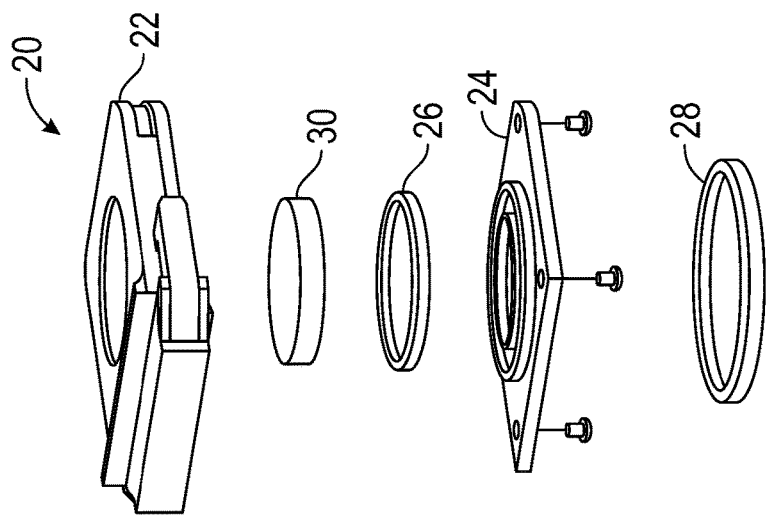
FIG. 2 illustrates an exploded view of a cover optic and a cartridge for the laser processing head.

FIG. 2 illustrates an exploded view of a typical cover slide cartridge 20 for the laser head of the present disclosure. The cartridge 20 includes a tray 22 with a central opening in which the cover optic 30 positions. Seals 26 and 28, a cover plate 24, and fasteners hold the cover optic 30 in place in the tray 22. When the cartridge 20 is installed in the head 10, the cover optic 30 acts as a protective cover for the internal optics of the head (10) so that dust and other debris does not interfere with the laser beam produced. Overtime, the cover optic 30 needs to be replaced due to the build-up of contamination on the optic 30. For this reason, the cover optic 30 is replaceable in the cartridge 20 and in the head 10.

Figure 3:
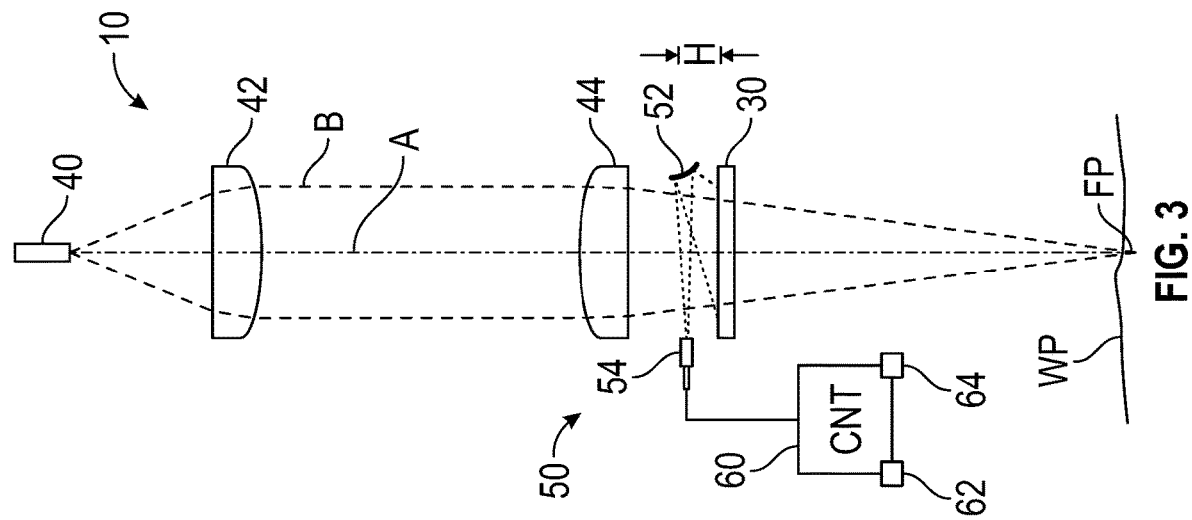
FIG. 3 diagrams elements of the laser processing head having a sensing apparatus of the present disclosure.

To determine the level of contamination of the cover optic 30 and whether it needs to be removed and replaced, the processing head 10 includes a sensing apparatus to monitor the contamination of the cover optic 30 FIG. 3 diagrams elements of the laser processing head 10 having a sensing apparatus 50 of the present disclosure. Internal optics of the head 10 are shown and include a laser input 40, a collimation lens 42, and a focusing lens 44. From there, the replaceable cover optic 30 is disposed in line with a longitudinal axis A of a laser beam B emitted from the laser processing head 10 to a workpiece WP.

The sensing apparatus 50 for monitoring the cover optic 30 is installed in the head 10. The components of the sensing apparatus 50 include at least one reflector 52 and at least one detector 54. The at least one detector 54 can connect to a controller 60 having one or more processors 62 and memory 64 to achieve the purposes of monitoring the cover optic 30 as disclosed herein. This controller 60 can be an independent controller from other control components for the laser processing head 10. Alternatively, the functionality of this controller 60 can incorporated into the overall control components of the laser processing head 10.

The evaluation electronics of the controller 60 may not necessarily need a general purpose central processing unit (CPU) and random access memory (RAM). Overall, the required electronics depends on costs and implementation details, which may be influenced by other sub systems of the processing head 10, e.g., whether there is a need for a general purpose CPU for other functions, etc.

Due to the sensitivity of the components of the sensing apparatus 50, the sensors 54 and reflectors 52 are preferably mounted inside the housing 12 of the processing head 10 behind the protection of the cover optic 30. If practical, the sensing apparatus 50 or an additional sensing apparatus could be used on the other side of the cover optics 30, although this may leave the component exposed to the lasing process. In some arrangements, the processing head may have two cover optics 30 with a space between them. In practice, the sensing apparatus 50 of the present disclosure can be disposed in the space between the two cover optics to image either one or both.

The laser input 40 can be a high power laser delivery fiber that emits a high power laser beam B. The collimation lens 42 collimates the beam B, and the focusing lens 44 focuses the beam B, which passes through the protective cover optic 30. The focused beam B impinges on a workpiece WP to perform the lasing operation.

During operation, an area on the cover optic 30 is illuminated by the beam B. This area includes not only the surface of the optic 30 inside the head 10 and facing the lasing optics 40, 42 and 44, but also includes the opposing surface of the optic 30 that faces outward from the head 10 and is exposed to contaminants directly from the lasing process.

The at least one detector 54 detects radiation during operation. There may be several different types of radiation that the can occur during operation and that the at least one detector 54 may or may not detect. In general, the at least one detector 54 may detect scattered light from the laser (stray light). Additionally, the at least one detector 54 can detect thermal radiation from the cover optic 30 itself. For example, the contamination may heat up the cover optic 30 itself, which in turn can radiate.

Moreover, the at least one detector 54 may detect visible and thermal radiation from the contamination on the illuminated area of the cover optic 30. The visible and thermal radiation may be caused by the illuminated contamination heating up. Illuminated by the beam B, for example, any contamination in the area of the cover optic 30 may emit radiation, which is reflected by the at least one reflector 52 onto the at least one detector 54. The at least one detector 54 detects the visible and thermal radiation from contamination related to the illuminated area of the cover optic 30.

A distinction can be made to the type of radiation being detected by the at least one detector 54. For example, at least the time varying intensity modulation of the lasing process itself can be filtered out so that the sensing apparatus 50 would tend to only react to actual contamination and not simply stray light from the laser. This filter can use hardware filtering or signal processing filtering.

In another variation, the at least one detector 54 of the apparatus 50 may use a sensor or a filter/sensor combination that detects only radiation above a certain wavelength associated with the composition of the cover optic 30. For example, the cover optic 30 may be composed of fused silica, and transmission of the fused silica drops significantly above a wavelength range of about 4 µm. Configured with this threshold, the sensing apparatus 50 can then be insensitive to everything happening below the cover optic 30 or above the focusing lens 44. In fact, the configured sensing apparatus 50 may really only see thermal radiation inside of the space between these two optical elements 30, 44.

The controller 60 processes the detected radiation of the sensor 54 to monitor the level of contamination on the cover optic 30 and to indicate the necessity of replacing the cover optic 30. For example, the memory 64 can store a threshold level of contamination. (As noted above, although more sophisticated electronics could be used, the sensing apparatus 50 may in fact use a simple dip switch on the head's electronics box that includes a few predefined levels.) The one or more processors 62 can be configured to compare the detected radiation to the threshold level and can indicate when replacement of the replaceable cover optic 30 may be needed in response to the comparison.

The algorithm for making the determination to replace the cover optic 30 can be primarily dependent upon the type of lasing process being performed. Some lasing processes may function well under conditions with more contamination than other processes. In general, the controller 60 operates with an algorithm in which the sensing apparatus 50 (i.e., reflectors 52, sensors 54, and the like) are calibrated to different levels of contamination relative to a given cover optic 30. The sensed responses are normalized, correlating levels of contamination to amounts, patterns, intensities, frequencies, or other characteristics of the radiation detected. Threshold levels for the amount of acceptable contamination on the cover optic 30 are defined for one or more given types of lasing processes. When the controller 60 for the head 10 then monitors operation of a given lasing process, the detected radiation can be equated to a correlated level of contamination, which can be compared to stored threshold. In this way, the level of contamination can be monitored on an ongoing or cyclical basis to determine if the threshold has been reached. If so, then the controller 60 may indicate the need to replace the cover optic 30 using any acceptable interface of associated processing equipment.

Depending on the implementation, straight-forward or more integrated algorithms can be implemented to monitor contamination of the cover optic 30. For example, FIG. 4A shows one process (90) for monitoring contamination of a cover optic 30. As the laser operates, radiation is reflected and detected by the sensing apparatus 50. The apparatus 50 monitors the radiation level and determines whether the level is above a defined threshold. If so, the apparatus can indicate the need to replace the cover optic 30. If severe enough, the lasing operation may be proactively modified.

In another example, FIG. 4B show a process (95) to monitor contamination of the cover optic 30 when the head 10 has zoom functionality. The beam diameter on the cover optic 30 changes with the currently set magnification, thereby changing the signal from the at least one detector 54. The apparatus 50 monitoring the contamination can be integrated with the zooming functionality and obtain the current magnification during operation. As the level is monitored, the apparatus 50 can normalize the signal from the at least one detector 54 to the actual power density based on the magnification. This normalization can then allow the resulting signal from the at least one detector 54 to be more easily used in monitoring contamination while accounting for changes due to magnification.

Preferably, the cover optic 30 is distanced as much as possible from the focused point FP of the beam B used in the lasing process. This increased distance can reduce consumption of the cover optic 30 during the lasing process and can reduce the number of times a new replacement is needed for the cover optic 30. At the same time, and especially for cutting applications, the total track length of the laser processing head 10 is preferably minimized so a shorter focal length can be used for the focusing lens 44. For these reasons, the height H of the sensing apparatus 50 of the present disclosure from the optic 30 can be of an advantageous low profile, thereby minimizing the amount of space needed in the laser processing head 10.

In some arrangements, another cover optic (not shown) can be positioned above the collimator lens 42 to protect the internal optics should the head 10 need to be removed from other components. If advantageous for a given implementation, this other cover optic may have a comparable sensing apparatus as disclosed herein.

Figure 5A:
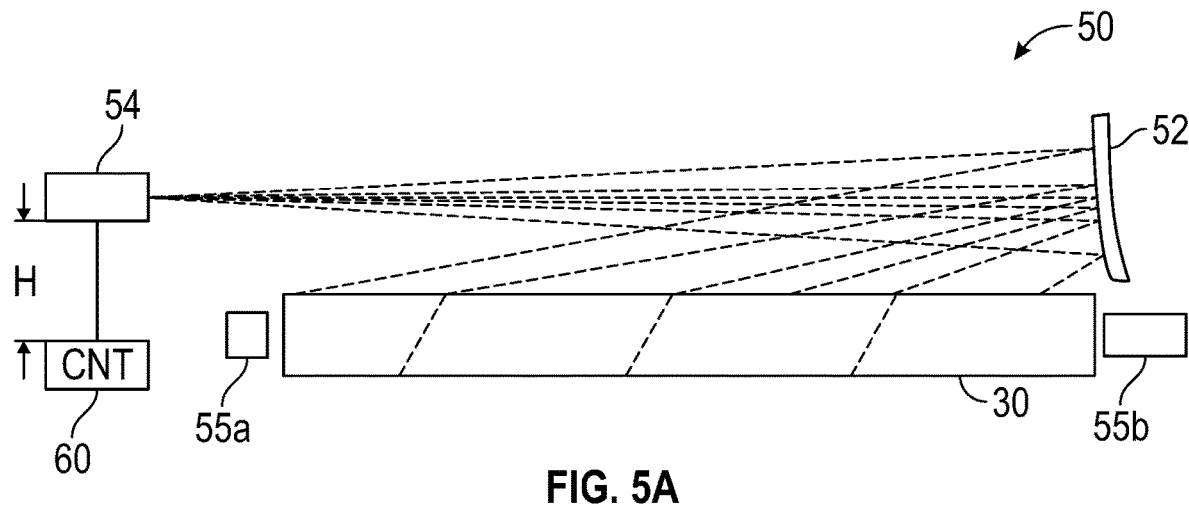
FIG. 5A illustrates a side view of a sensing apparatus of the present disclosure adjacent a cover optic.
Figure 5B:
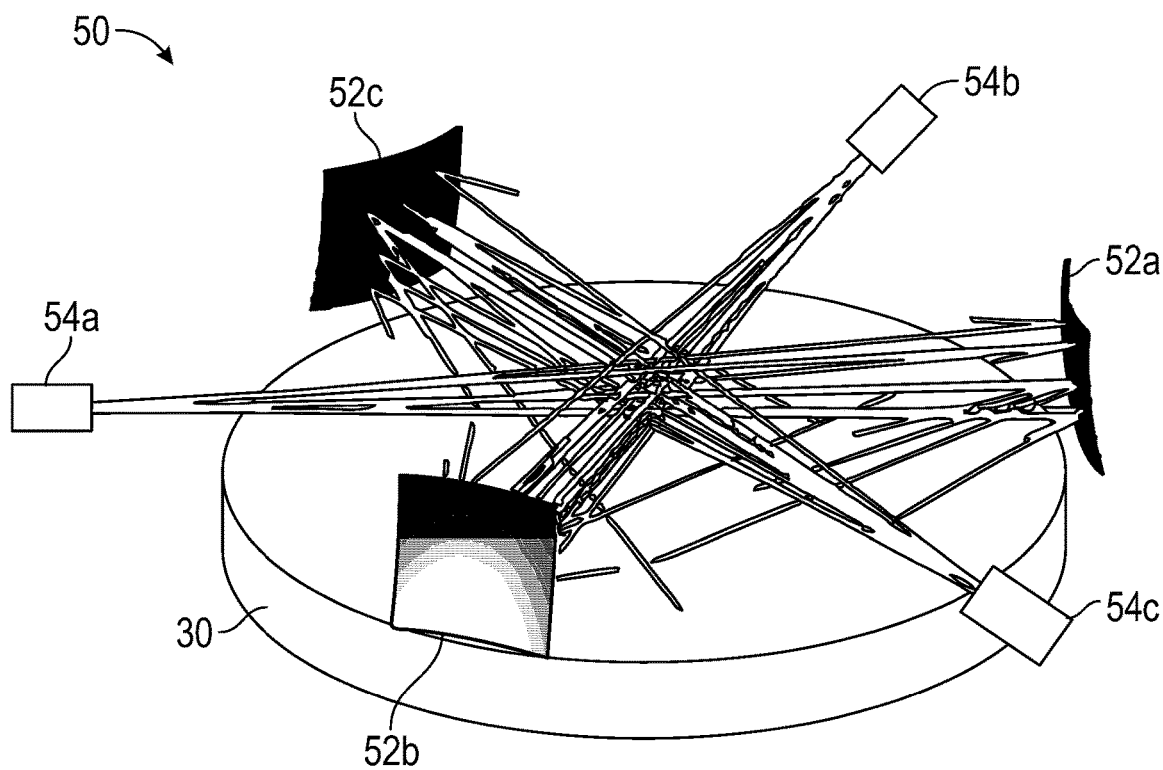
FIG. 5B illustrates a perspective view of the sensing apparatus of the present disclosure adjacent the cover optic.

Further details of the sensing apparatus 50 are provided in FIGS. 5A-5B. As shown in the side view of FIG. 5A, at least one reflector 52 is disposed in the laser processing head (10) adjacent a periphery of the replaceable cover optic 30.

As disclosed herein, the sensing apparatus 50 senses contamination on the cover optic 30. Contamination leads to temperature gradients in the optic 30 and can cause the focus of the beam B to shift. This can affect the lasing process negatively, and may ultimately lead to destruction of the cover optic 30.

The at least one reflector 52 is configured to reflect radiation resulting by scattering and/or absorption of the laser beam at contamination sites on the replaceable cover optic 30 and incident against the at least one reflector 52. The radiation can be caused by contamination on either side of the cover optic 30 (e.g., either inside the head or outside the head). Overall, the cover optic 30 is composed of a transparent material and may be relatively thin in comparison to its surface area. Therefore, the sensing apparatus 50 can sense the overall effects of contamination on the cover optic 30.

The at least one sensor 54 is disposed in the laser processing head adjacent the periphery of the replaceable cover optic 30 and is disposed in offset relation relative to the at least one reflector 52. As shown, the at least one reflector 52 and the at least one sensor 54 are disposed on a lateral plane at a short height H parallel to the replaceable cover optic 30. The at least one sensor 54 is directed along this lateral plane parallel to the replaceable cover optic 30. In this way, the at least one sensor 54 is configured to detect at least a portion of the radiation reflected by the at least one reflector 52 opposing it.

As noted previously, the controller 60 is in communication with the at least one sensor 54 and is configured to determine the contamination on the replaceable cover optic 30 based on the radiation detected by the at least one sensor 52.

If desired, the sensing apparatus 50 can also be used with one or more additional sensing elements, such as a temperature sensor 55a associated with the cartridge (20) of the cover optic 30. As contamination builds up on the cover optic 30, the cover optic 30 tends to increase in temperature, which can be detected in the cartridge (20) that supports the cover optic 30. Additionally, one or more edge sensors 55b for measuring stray light can be arranged around the edge of the cover optic 30 to measure contamination. These additional sensing elements can be monitored by the controller 60.

To increase monitoring of the illuminated area of the cover optic 30, more than one reflector 52 and sensor 54 can be used. For example, FIG. 5B shows an arrangement for the apparatus 50 having several reflectors 52a-c and several sensors 54a-c.

The several sensors 54a-c are arranged above the optic 30, and their field of view is parallel to the surface of the optic 30. The sensors 54a-c can image the optic 30 via several polished freeform reflectors 52a-c. The reflectors 52a-c can be mostly convex so the reflectors 52a-c can distort and expand the field of view of the sensor 52a-c to cover as much of the illuminated area of the optic 30 as possible. In one configuration, the surface of the reflector 52 may be a section of toroid. Several of the sensors 54a-c can be combined to maximize coverage of the optic's surface area, if the freeform surface of the reflectors 52a-c by itself is not sufficient to cover the whole optic 30. The sensors 54a-c image the optic 52 at a steep angle. Absorbing surfaces or more complicated geometrical arrangements can be used to minimize stray light to the sensor 54a-c from other parts of the optomechanical system.

Figure 6A:
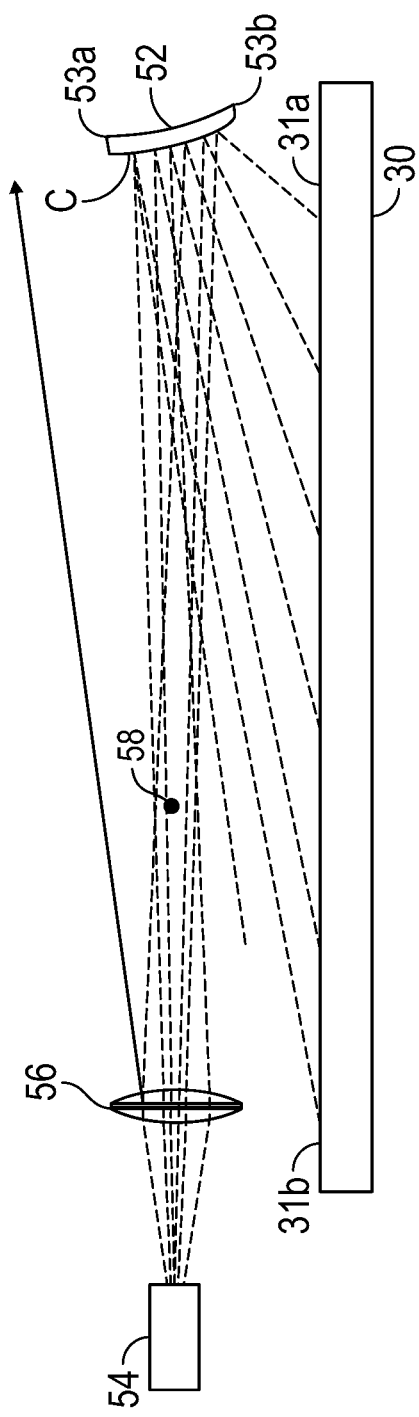
FIGS. 6A-6B illustrate side views of additional sensing arrangements of the present disclosure adjacent a cover optic.

In one variation shown in FIG. 6A, a lens 56 can be positioned directly in front of the detector 54 between the detector 54 and the reflector 52 to reduce the field of view of the detector 54 to more closely match the reflector size and boost the signal. Also, an intermediate focus point 58 can be made between the detector 54 and reflector 52 so the detector 54 can be virtually closer to the cover optic's surface.

These lensing arrangements may influence the required curvature C of the reflector 52, maybe even to the point of not requiring any curvature C on the reflector 52. In particular, the field of view of the sensor 54 (having a photodiode) is usually divergent. By adding the additional positive lens 56, the sensor 54 is moved virtually closer to the reflector 52. The curvature C of the reflector 52 in this case can be adapted to match the new virtual position of the sensor 54. Essentially, the sensor 54 has a more usable field of view. In addition, the virtually closer field of view of the sensor 54 can reduce the influence of unwanted stray light from the surrounding mechanics (or unwanted thermal radiation in the case of thermal sensors from parts that get hot due to other reasons).

Figure 6B:
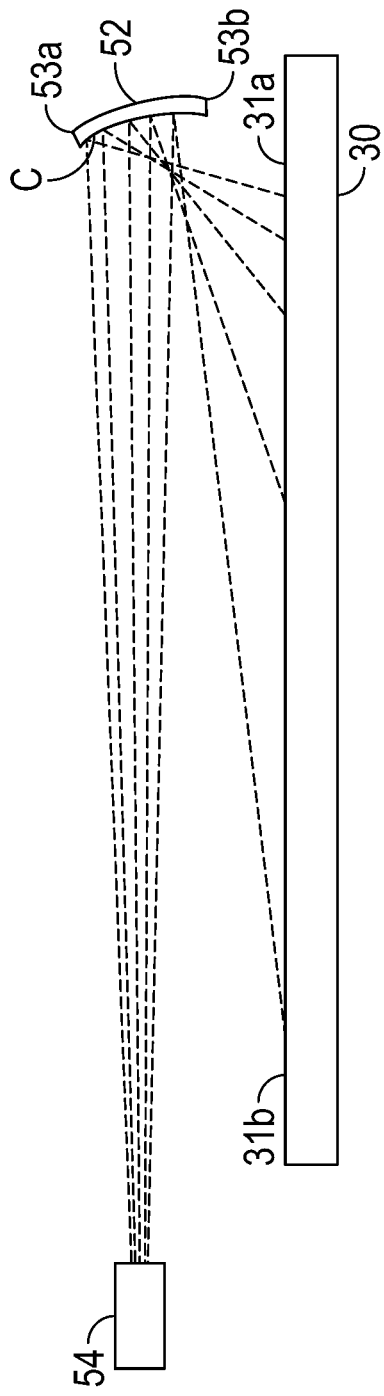

In another variation in FIG. 6B, a concave reflector 52 with a very small radius of curvature C can be used and can also be used in connection with a lens (not shown). These variations can create an intermediate focus in the field of view cone from the detector 54 to the cover optic 30, after which the cone would rapidly spread out due to the small radius of curvature. In the case of FIG. 6B, an intermediate focus is created after the reflector 52.

The arrangements in FIGS. 5A-5B and 6A-6B illustrate why the system may have reflectors 52 with a surface that is something more than purely toroidal. Overall, the ray density at the edge/side 31a of the cover slide 30 adjacent the reflector 52 is higher than on the opposite edge 31b. The corresponding sensor 54 therefore tends to see more of the adjacent edge/side 31a. To make this more homogeneous in this plane, the curvature C of the reflector 52 can vary over the height of the reflector 52. Accordingly, in FIG. 6A, for example, the curvature C of the convex reflector 52 may be greater toward the bottom 53b and less toward the top 53a. In FIG. 6B, the curvature C of the concave reflector 52 may be less toward the bottom 53b and greater toward the top 53a.

For uniformity in the disclosed examples, such as in FIG. 5B, three reflectors 52a-c are shown disposed at 120-degrees from one another about the periphery of the cover optic 30, and three sensors 54a-c are disposed at 120-degrees from one another and arranged at an offset from the three reflectors 52a-c about the periphery of the cover optic 30. In one example geometry having three sensors 54a-c and three toroidal reflectors 52a-c, the reflectors 52a-c can have a height H of about 6-mm or less from the cover optic 30.

As will be appreciated, one or more sensors 54 and one or more reflectors 52 can be used to suit the implementation. Therefore, more or less of each of the reflectors 52 and sensors 54 can be used. For example, one sensor 54 can be used with one large reflector 52, one sensor 54 can be used with multiple reflectors 52 arranged about the periphery, multiple sensors 54 can be used with one ring-shaped reflector 52, etc. In one particular example, a single, ring-shaped reflector 52 can encircle the perimeter of the cover optic 30 at a small height H, and multiple sensors 54 can be positioned in viewing slots defined around the circumference of the ring-shaped reflector 52. Overall, any suitable combination of sensor and reflector configurations can be used that best suit the type of laser processing head and the lasing process being performed.

Figure 7:
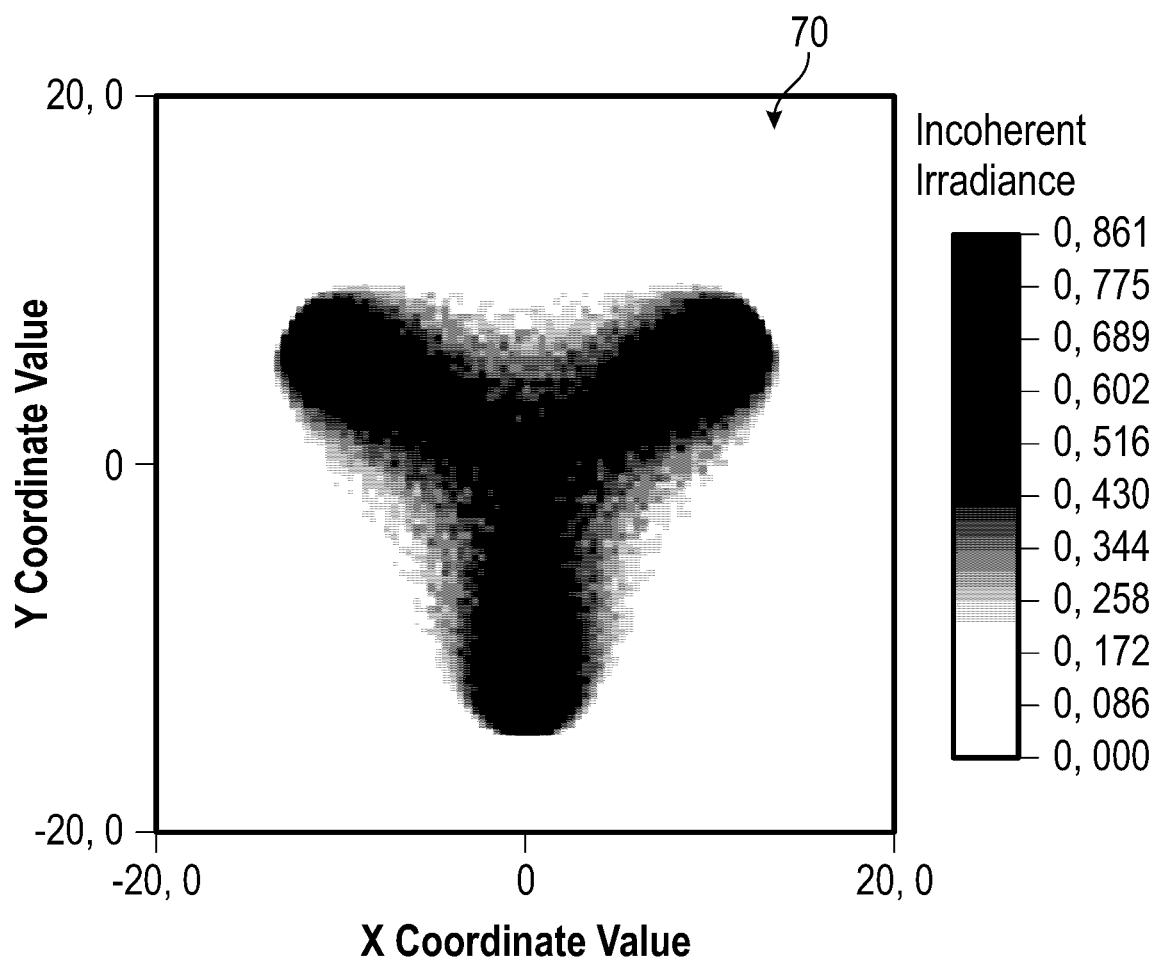
FIG. 7 illustrates a graph of example coverage of the disclosed sensing apparatus of a cover optic.

FIG. 7 illustrates a graph of example coverage of the sensing apparatus 50 of FIG. 4B. To detail the field of view in this example, incoherent irradiance is graphed along X and Y coordinates across the plane of the cover optic 30. Modifying the arrangement of the sensors 54, the surface shape of the reflectors 52, the number of sensors 54, the number of reflectors 52, and the like can alter the resulting coverage. These details can be configured for a given implementation.

In the sensing apparatus 50, the at least one sensor 54 can include a photodiode, pyrometer, stray light sensor, or other radiation detector. In general, the sensor 54 may measure in the visible and near-infra red spectrum. In one preferred arrangement, the at least one sensor 54 is a pyrometer that can measure information related to the temperature of the cover optic 30 and that can be less effected by stray light from the process.

The at least one reflector 52 can include a freeform mirror or other reflective surface. The at least one reflector 52 can be coated with a highly reflective material, such as gold, so the reflector 52 would reflect most of the radiation and would tend to not absorb radiation so the reflector 52 will not heat up during operation.

Figure 8:
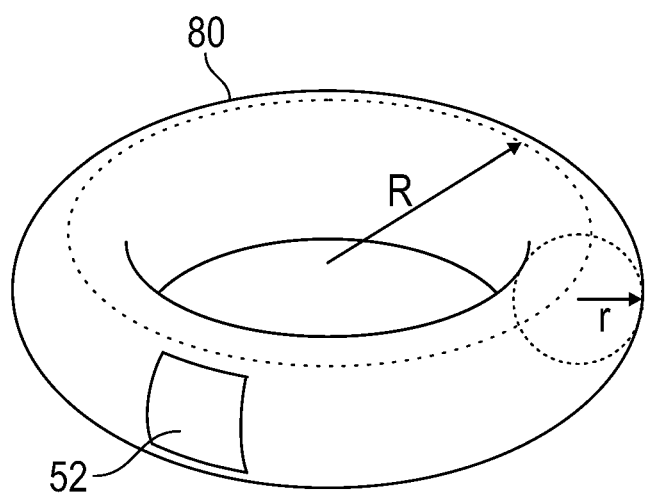
FIG. 8 illustrates a proposed shape for the reflectors of the sensing apparatus.

In general, the at least one reflector 52 can be curved, convex, aspherical, or a non-rotational symmetric surface to reflect more of the radiation from the cover optic 30. As shown in one particular configuration of FIG. 8, for example, the reflector 52 can be a section of a ring torus 80. As such, the reflector 52 can define a first radius of curvature R along a lateral dimension and can define a second radius r of curvature along a longitudinal dimension. The first radius R would define a portion of a major radius R of the ring torus 80, and the second radius r would defines a portion of a minor radius r of the ring torus 80.

Figure 9A:
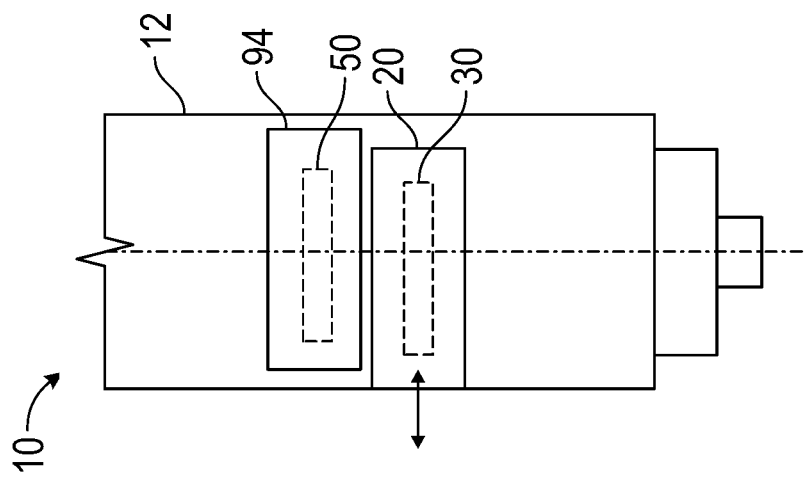
FIGS. 9A-9C schematically illustrate arrangements for a laser processing head having a sensing apparatus of the present disclosure.
Figure 9B:
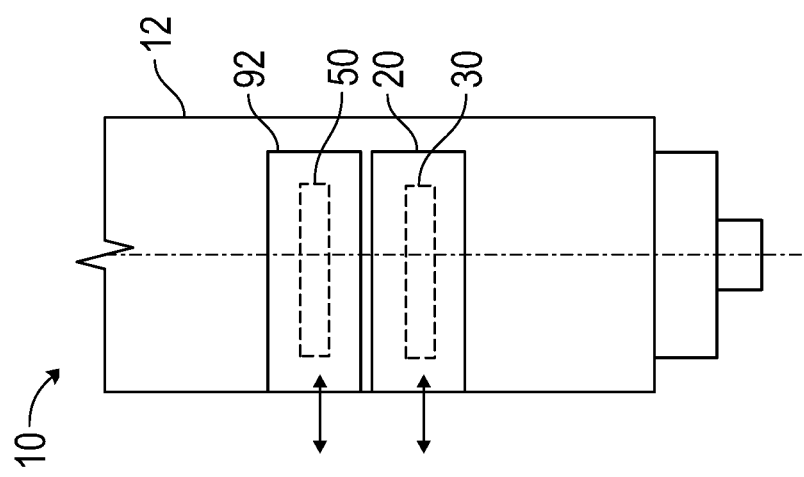
Figure 9C:
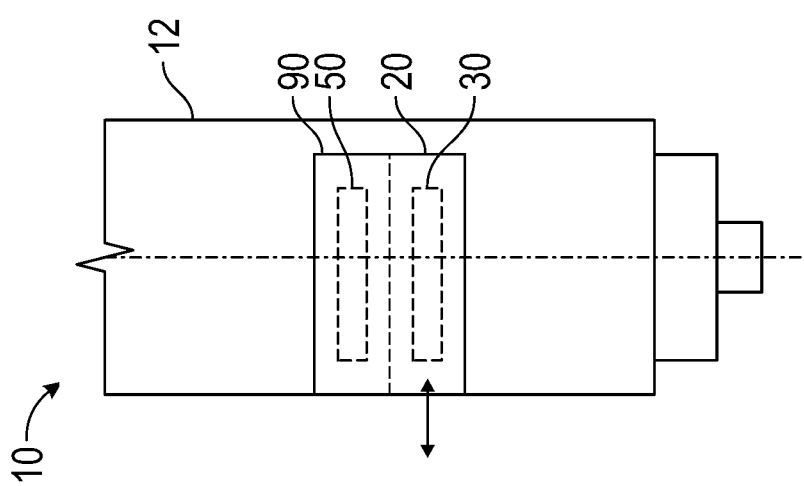

FIGS. 9A-9C schematically illustrate arrangements of laser processing heads 10 having a sensing apparatus 50 of the present disclosure. In FIG. 9A, the replaceable cover optic 30 is illustrated in a cartridge 20 that can be inserted and removed from the head's housing 12 as noted previously. Here, the sensing apparatus 50 having one or more of the components for the reflectors (52), sensors (54), lenses (56), etc. disclosed herein can be incorporated into portion 90 of this cartridge 20. Other of the components of the reflectors (52), sensors (54), lenses (56), etc. disclosed herein can be incorporated into the housing 12 adjacent the cartridge 20.

In FIG. 9B, the replaceable cover optic 30 is illustrated in a cartridge 20 that can be inserted and removed from the head's housing 12 as noted previously. Here, the sensing apparatus 50 having one or more of the components for the reflectors (52), sensors (54), lenses (56), etc. disclosed herein can be incorporated into its own replaceable cartridge 92. Other of the components of the reflectors (52), sensors (54), lenses (56), etc. disclosed herein can be incorporated into the housing 12.

In FIG. 9C, the replaceable cover optic 30 is illustrated in a cartridge 20 that can be inserted and removed from the head's housing 12 as noted previously. Here, the sensing apparatus 50 having one or more of the components for the reflectors (52), sensors (54), lenses (56), etc. disclosed herein can be incorporated into the head 10 and contained in the housing 12. Internal mechanical structures 94 and the like can support the components. As these arrangements in FIGS. 9A-9C will show, the apparatus 50 of the present disclosure can be incorporated in a number of ways for use in a laser processing head 10 relative to a replaceable cover optic 30.

As disclosed herein, the sensing apparatus 50 has a low profile in a parallel plane adjacent the cover optic 30. This configuration is particularly advantageous over an arrangement in which a sensor (e.g., pyrometer) is used in the housing 12 of the head 10 at a position well above the cover optic 30. Such an arrangement would require more space to accommodate.

Moreover, the configuration of the disclosed apparatus 50 is more reliable than an arrangement in which just a stray light sensor is used in the head at the edge of the cover optic 30. Here, the geometry of the sensing apparatus 50 allows the sensor 54 to detect more radiation from the illuminated area of the cover optic 30 without requiring too much space inside the laser processing head 10.

The foregoing description of preferred and other embodiments is not intended to limit or restrict the scope or applicability of the inventive concepts conceived of by the Applicants. It will be appreciated with the benefit of the present disclosure that features described above in accordance with any embodiment or aspect of the disclosed subject matter can be utilized, either alone or in combination, with any other described feature, in any other embodiment or aspect of the disclosed subject matter.

In exchange for disclosing the inventive concepts contained herein, the Applicants desire all patent rights afforded by the appended claims. Therefore, it is intended that the appended claims include all modifications and alterations to the full extent that they come within the scope of the following claims or the equivalents thereof.

What is claimed is:

1. An apparatus for a laser processing head having a replaceable cover optic, the replaceable cover optic disposed in line with a longitudinal axis of a laser beam emitted from the laser processing head in a lasing process, the apparatus comprising:
   at least one reflector disposed adjacent a periphery of the replaceable cover optic, the at least one reflector configured to reflect radiation generated by interaction of the laser beam with contamination on the replaceable cover optic and incident against the at least one reflector, wherein the at least one reflector is positioned on a same side of the replaceable cover optic as the laser beam is incident thereon; and
   at least one sensor disposed adjacent the periphery of the replaceable cover optic, the at least one sensor disposed in offset relation relative to the at least one reflector, the at least one sensor configured to detect at least a portion of the radiation reflected by the at least one reflector, wherein the at least one reflector is convex to the at least one sensor.

2. The apparatus of claim 1, wherein the at least one reflector is configured to reflect radiation generated by scattering and/or absorption of the laser beam by the contamination on the replaceable cover optic.

3. The apparatus of claim 1, wherein the at least one sensor comprises a filter configured to filter out radiation associated with a wavelength of the lasing process.

4. The apparatus of claim 1, wherein the apparatus comprises circuitry configured to filter out radiation associated with a time varying intensity modulation of the lasing process.

5. The apparatus of claim 1, further comprising a lens disposed between the at least one reflector and the at least one sensor.

6. The apparatus of claim 1, wherein the at least one reflector and the at least one sensor are disposed on a lateral plane parallel to the replaceable cover optic.

7. The apparatus of claim 6, wherein the at least one sensor is directed along the lateral plane parallel to the replaceable cover optic.

8. The apparatus of claim 1, wherein the at least one reflector comprises a reflective coating disposed thereon.

9. The apparatus of claim 1, wherein the at least one sensor comprises a pyrometer.

10. The apparatus of claim 1, wherein the at least one sensor and the at least one reflector are disposed inside an interior of the laser processing head adjacent an inside surface of the cover optic.

11. The apparatus of claim 1, further comprising a controller in communication with the at least one sensor and configured to determine a level of the contamination on the replaceable cover optic based on the radiation detected by the at least one sensor.

12. The apparatus of claim 11, wherein the controller comprises one or more processors and memory, the memory storing at least one threshold, the one or more processors configured to: correlate the level of the contamination to the radiation detected, compare the correlated level to the at least one threshold, and indicate replacement of the replaceable cover optic in response to the comparison.

13. The apparatus of claim 12, wherein the at least one threshold stored in memory is one of a plurality of thresholds stored in memory, each being dependent upon a given one of the lasing process.

14. An apparatus for a laser processing head having a replaceable cover optic, the replaceable cover optic disposed in line with a longitudinal axis of a laser beam emitted from the laser processing head in a lasing process, the apparatus comprising:
   at least one reflector disposed adjacent a periphery of the replaceable cover optic, the at least one reflector configured to reflect radiation generated by interaction of the laser beam with contamination on the replaceable cover optic and incident against the at least one reflector; and at least one sensor disposed adjacent the periphery of the replaceable cover optic, the at least one sensor disposed in offset relation relative to the at least one reflector, the at least one sensor configured to detect at least a portion of the radiation reflected by the at least one reflector, wherein the at least one reflector comprises at least three of the at least one reflector disposed at equidistant degrees from one another about the periphery of the replaceable cover optic.

15. The apparatus of claim 14, wherein the at least one sensor comprises at least three of the at least one sensor disposed at the equidistant degrees from one another offset from the at least three reflectors about the periphery of the replaceable cover optic.

16. The apparatus of claim 14, wherein the at least one reflector is convex to the at least one sensor.

17. An apparatus for a laser processing head having a replaceable cover optic, the replaceable cover optic disposed in line with a longitudinal axis of a laser beam emitted from the laser processing head in a lasing process, the apparatus comprising:

at least one reflector disposed adjacent a periphery of the replaceable cover optic, the at least one reflector configured to reflect radiation generated by interaction of the laser beam with contamination on the replaceable cover optic and incident against the at least one reflector; and at least one sensor disposed adjacent the periphery of the replaceable cover optic, the at least one sensor disposed in offset relation relative to the at least one reflector, the at least one sensor configured to detect at least a portion of the radiation reflected by the at least one reflector, wherein the at least one reflector defines a first radius of curvature along a lateral dimension and defines a second radius of curvature along a longitudinal dimension.

18. The apparatus of claim 17, wherein the first radius defines at least a portion of a major radius of a ring torus; and wherein the second radius defines at least a portion of a minor radius of the ring torus.

19. An apparatus for a laser processing head having a replaceable cover optic, the replaceable cover optic disposed in line with a longitudinal axis of a laser beam emitted from the laser processing head in a lasing process, the apparatus comprising:

at least one reflector disposed adjacent a periphery of the replaceable cover optic, the at least one reflector configured to reflect radiation generated by interaction of the laser beam with contamination on the replaceable cover optic and incident against the at least one reflector; and at least one sensor disposed adjacent the periphery of the replaceable cover optic, the at least one sensor disposed in offset relation relative to the at least one reflector, the at least one sensor configured to detect at least a portion of the radiation reflected by the at least one reflector, wherein the at least one reflector defines a curvature being varied from a top to a bottom of the at least one reflector.

20. A laser processing head having a replaceable cover optic, the replaceable cover optic disposed in line with a laser beam emitted from the laser processing head, the head comprising:

a receptacle disposed on the laser processing head for holding the replaceable cover optic;

at least one reflector disposed adjacent the receptacle, the at least one reflector configured to reflect radiation generated by interaction of the laser beam with contamination on the replaceable cover optic and incident against the at least one reflector, wherein the at least one reflector is positioned on a same side of the replaceable cover optic as the laser beam incident thereon; and at least one sensor disposed adjacent the periphery of the receptacle, the at least one sensor disposed in offset relation relative to the at least one reflector, the at least one sensor configured to detect at least a portion of the radiation reflected by the at least one reflector, wherein the at least one reflector is convex to the at least one sensor.

21. A method used with a laser processing head having a replaceable cover optic, the replaceable cover optic disposed in line with a laser beam emitted from the laser processing head, the method comprising:

reflecting, with at least one reflector disposed on the laser processing head adjacent the replaceable cover optic, radiation generated by interaction of the laser beam with contamination on the replaceable cover optic and incident against the at least one reflector;

detecting, with at least one sensor disposed on the laser processing head adjacent the periphery of the replaceable cover optic and in offset relation relative to the at least one reflector, at least a portion of the radiation reflected by the at least one reflector, wherein the at least one reflector is convex to the at least one sensor; and determining a level of the contamination on the replaceable cover optic based on the radiation detected by the at least one sensor.

22. An apparatus for a laser processing head having a replaceable cover optic, the replaceable cover optic disposed in line with a longitudinal axis of a laser beam emitted from the laser processing head in a lasing process, the apparatus comprising:

at least one reflector disposed adjacent a periphery of the replaceable cover optic, the at least one reflector configured to reflect radiation generated by interaction of the laser beam with contamination on the replaceable cover optic and incident against the at least one reflector, wherein the at least one reflector is positioned on a same side of the replaceable cover optic as the laser beam is incident thereon;

at least one sensor disposed adjacent the periphery of the replaceable cover optic, the at least one sensor disposed in offset relation relative to the at least one reflector, the at least one sensor configured to detect at least a portion of the radiation reflected by the at least one reflector; and a lens disposed between the at least one reflector and the at least one sensor, wherein the lens is configured to provide an intermediate focus point of the at least one sensor optically between the at least one reflector and the at least one sensor.

23. . An apparatus for a laser processing head having a replaceable cover optic, the replaceable cover optic disposed in line with a longitudinal axis of a laser beam emitted from the laser processing head in a lasing process, the apparatus comprising:

at least one reflector disposed adjacent a periphery of the replaceable cover optic, the at least one reflector configured to reflect radiation generated by interaction of the laser beam with contamination on the replaceable cover optic and incident against the at least one reflector, wherein the at least one reflector is positioned on a same side of the replaceable cover optic as the laser beam is incident thereon; and at least one sensor disposed adjacent the periphery of the replaceable cover optic, the at least one sensor disposed in offset relation relative to the at least one reflector, the at least one sensor configured to detect at least a portion of the radiation reflected by the at least one reflector, wherein the at least one reflector is concave to the at least one sensor.

24. . The apparatus of claim 23, wherein the at least one reflector and the at least one sensor are configured such that the at least one reflector is optically between the at least one sensor and an intermediate focus point of the at least one sensor.

\* \* \* \* \*